United States Patent [19]

Simon

[11] Patent Number: 4,475,576

[45] Date of Patent: Oct. 9, 1984

[54] WINE PRESERVATION SYSTEM

[76] Inventor: Philip E. Simon, 10072 Roscoe Blvd., Sun Valley, Calif. 91352

[21] Appl. No.: 414,710

[22] Filed: Sep. 3, 1982

[51] Int. Cl.³ .............................................. B65B 3/04
[52] U.S. Cl. ..................................... 141/98; 141/302; 215/309; 215/311
[58] Field of Search ....................... 141/4, 5, 6, 69, 91, 141/98, 285, 291, 292, 295, 325, 326, 351, 57, 37, 38, 285–310, 382–386; 53/432, 434, 510, 512, 86, 403; 215/309, 311, 315, 312, 313, 314; 426/418, 397, 112

[56] References Cited

U.S. PATENT DOCUMENTS

| | | | |
|---|---|---|---|
| 1,983,381 | 12/1934 | MacGill | 215/315 |
| 2,314,167 | 3/1943 | Shaw | 215/311 |
| 2,593,770 | 4/1952 | Kollsman | 141/57 |
| 3,205,923 | 9/1965 | Wilson | 141/291 |
| 3,455,349 | 7/1969 | Greenwood et al. | 141/325 |
| 3,556,174 | 1/1971 | Gibble | 53/510 |
| 3,871,425 | 3/1975 | Fee et al. | 141/351 |
| 4,059,113 | 11/1977 | Beinsen et al. | 53/432 |
| 4,312,171 | 1/1982 | Vadas | 53/510 |

FOREIGN PATENT DOCUMENTS

| | | | |
|---|---|---|---|
| 0151918 | 11/1981 | Fed. Rep. of Germany | 141/4 |
| 90461 | 10/1937 | Sweden | 215/309 |
| 787732 | 12/1980 | U.S.S.R. | 141/5 |

Primary Examiner—Houston S. Bell, Jr.
Attorney, Agent, or Firm—Ralph S. Branscomb

[57] ABSTRACT

A convenient oxygen purging system for bottled wines is provided utilizing a counter-top inert gas bottle housing having a depending contactoperated gas dispensing head. A separate stopper is provided which fits into the opened mouth of a wine bottle, the stopper having a valved port system such that when pressed against the inert gas dispensing head, the inert gas is blown inside the wine bottle, expelling the air from the bottle through an evacuation port and replacing the air with the inert gas. The stopper is left in the bottle, so that ordinarily a number of the stoppers would be provided so that more than one bottle could be maintained in a preserved condition at one time.

3 Claims, 9 Drawing Figures

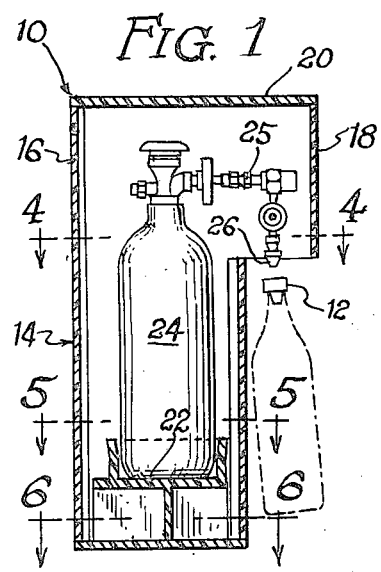
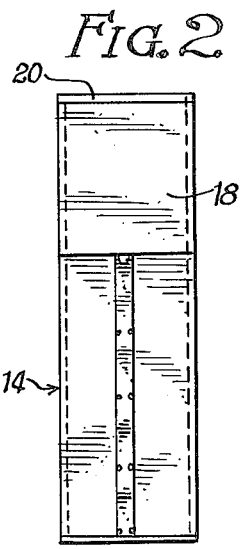
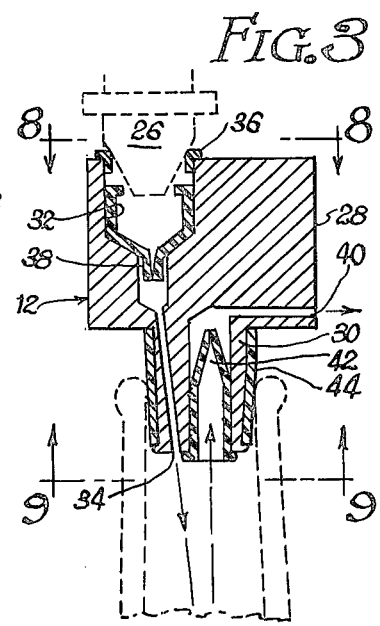
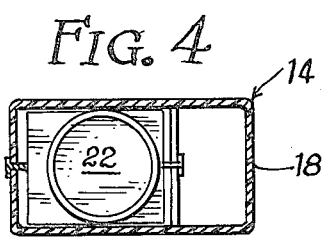
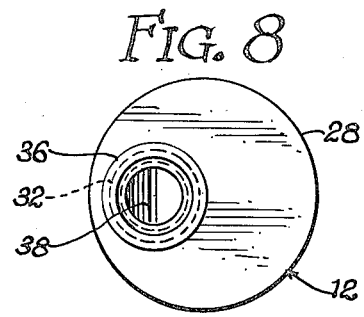
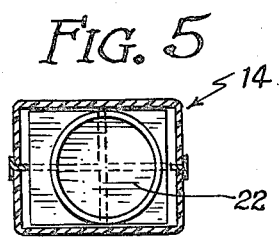
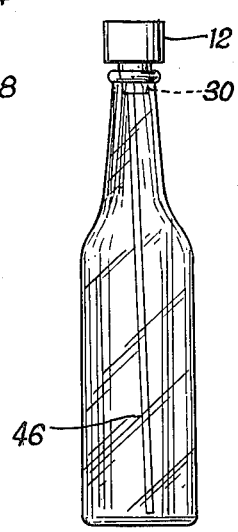
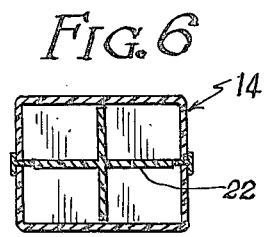
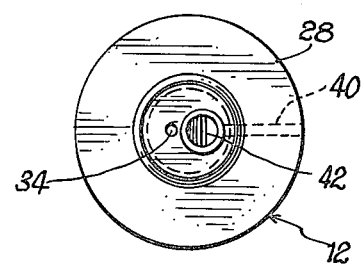

WINE PRESERVATION SYSTEM

BACKGROUND OF THE INVENTION

It is a known fact that oxygen has a deleterious effect on the quality of wine over a period of time. The chemistry of wine is very complicated and the various ingredients and flavoring agents that constitute its bouquet and flavor might be over a thousand. Many of these substances, which may appear in trace quantities, will be directly oxidized.

In some instances this oxidation affects the wine in a visible way. The coloring agent of the wine after oxidation may not only completely change the color of the wine, but might also leave a residue of the oxidized coloring matter at the bottom. Thus an attractive red wine, if left exposed to oxygen for a period of time such as by recorking a partially consumed bottle, would likely be reduced to a brown rust color with a layer of sediment across the bottom.

In addition to the disasterous effects of oxidation on both the flavor ingredients and the color, ozidation ultimately results in a conversion of unoxidized flavor components into acetic acid.

Because of these actions of atmospheric oxygen, it is ordinarily understood that a good bottle of wine must be completely consumed at one sitting. Whereas wineries have inert gas systems to protect the wine during its processing, and wine bars often have a nitrogen system which will in essence permit the tapping of several bottles of wine simultaneously while replacing the displaced wine with slightly pressurized nitrogen. Both aforementioned systems are limited in scope to either bulk quantities (at the winery level) or a specific number of pressurized bottles.

There is a real need therefore for a simple system which is easily used by individual connoisseurs, commercial wine establishments and restaurants alike, whereby an unlimited number of bottles of wine can be preserved in an inert gas between uses.

SUMMARY OF THE INVENTION

The instant system fulfills the above-stated need and is based on the concept of utilizing a separate stopper for each bottle to replace the cork and remain with the bottle for the lifetime of the wine. Each stopper is provided with passageways and valves to permit the bottle to be pressed against a contact-operated dispenser head, directing a blast of inert gas such as Argon into the bottle to expel at first air, and subsequently a mixture of air and Argon or other inert gas, until the percentage of oxygen is so low as not to represent a threat to the wine.

BRIEF DESCRIPTION OF THE DRAWINGS

FIG. 1 is a side elevation view of the dispenser with the housing being shown in sections;

FIG. 2 is an end elevation view of the dispenser of FIG. 1 seen from the right end;

FIG. 3 is a section taken through the stopper indicating the dispensing head in phantom;

FIG. 4 is a section taken along line 4—4 of FIG. 1;

FIG. 5 is a section taken along line 5—5 of FIG. 1;

FIG. 6 is a section taken along line 6—6 of FIG. 1;

FIG. 7 is an elevation view of a wine bottle with the stopper therein; and illustrating an alternative mode wherein a stainless steel tube connected to the intake port delivers gas to the bottom of the bottle;

FIG. 8 is a top elevation view of the stopper showing the intake port; and

FIG. 9 is a bottom elevation view of the stopper illustrating the end of the injection nozzle and the evacuation port with the check valve therein.

DETAILED DESCRIPTION OF THE PREFERRED EMBODIMENT

The invention breaks down into two basic components, the gas supply system 10, and the actual stopper itself 12. The gas system consists of a housing 14 made of formed, high-grade plastic or the like, formed into a rectangular body portion 16 with a protusion 18 at the top which is open from below to permit access to the gas. An access lid 20 covers the entire body of the structure, and a gas cannister support stand 22 supports the cannister 24 of Argon or some other inert gas.

The gas cannister has a transverse connector 25 with a depending link terminating in a dispensing head 26 which is contact-actuated, that is upon pressing on the head, it dispenses its inert gas.

The stopper itself includes a solid body 28 and a depending tapered plug portion 30. An intake port 32, cylindrical in the preferred embodiment, communicates with an injector nozzle 34. The upper edge of the intake port utilizes annular flange 36 to help mate the intake port to the dispenser head 26. A tubular flap valve 38 with a pinched lower end acts partially as a check valve to prevent backflow of gas upwardly through the intake port, and also acts as a threshold valve for gas traveling down, to insure that there is no convection of atmospheric air through the intake port when a wine bottle has been stored with the stopper in place.

An evacuation port 40 has a tubular flap valve 42 in the lower portion similar to flap valve 38. This valve has the same effect as the first-mentioned valve in acting as both a check valve and threshold valve.

The lower portion or plug 30 has a resilient preferably frictional sleeve 44 to permit a hermetic seal to be easily made with the mouth of the bottle.

In use, once a bottle of wine is opened and partially used, it is provided with a stopper 12. The stopper remains with the bottle. The bottle with the stopper is pressed up onto the dispensing head 26 of the gas system 10 permitting gas to stream through the injector nozzle 34. The blast of inert gas swirls with the atmospheric air inside the wine bottle, blowing it out the evacuation port so that after an injection lasting between five and ten seconds there is very little oxygen remaining in the bottle. Argon also, by virtue of an atomic weight roughly three times that of oxygen, has a blanketing effect in the bottle betwwen the wine and asmospheric air residue.

After charging with Argon, the stopper is removed from contact with the dispensing head and left in the bottle until the next usage of the bottle is required. The bottle may stand for days or weeks without the wine inside deteriorating because of oxygen. The slight threshold effect of the check valves in the intake and evacuation ports prevents the circulation of atmospheric air into the bottle as a matter of convection.

A slight modification of the invention is shown in FIG. 7 wherein tube 46 extends into the bottom of the bottle. This tube is threaded into the stopper around the nozzle 34, and actually bubbles Argon up through the wine, to at least partially replace any dissolved air in the wine.

Because the system is simple, inexpensive and permits individual wine bottles to be removed from the inert gas system without re-capping, it is ideal for home use, restaurant use, and other places where an elaborate multi-bottle system feeding from a central manifold having a tap for each bottle would be impractical.

While the preferred embodiment of the invention has been described, other modification may be made thereto and other embodiments may be devised within the spirit of the invention and scope of the claims.

What is claimed is:

1. A wine bottle stopper for purging oxygen from a wine bottle, and then remaining in the neck of the wine bottle to replace the cork, comprising:
   (a) an upper stopper portion;
   (b) a lower stopper portion integral with said upper stopper portion and being tapered to fit through the opening and into the neck of a wine bottle to replace the cork, said lower portion having a resilient seating sleeve to seal against the insides of the bottle neck;
   (c) an intake port defined in said stopper communicating between the outside and inside of said bottle and having an expanded upper end to seat against the dispensing head of an inert gas dispenser;
   (d) said intake port having an expanded portion defining an intake check valve seat;
   (e) an evacuation port defined in said stopper communicating between inside and outside of said bottle and having an expanded portion defining an evacuation check valve seat; and,
   (f) each of said check valves comprising a resilient tubular sleeve with a pinched downstream end permitting gases to pass only from within the tube out through the pinched end.

2. Structure according to claim 1 wherein said evacuation check valve opens at an internal bottle pressure of only slightly above atmospheric pressure to minimize pressure requirements at the intake port.

3. Structure according to claim 1 wherein at least one of said valves is seated within said lower stopper portion to reside within the neck area of the bottle to minimize space requirements of the stopper and external projections.

* * * * *